3,318,945
CYCLODODECADIENE CARBOXYLIC
ACID ESTERS
William Francis Erman, Cincinnati, Ohio, assignor to The Procter & Gamble Company, Cincinnati, Ohio, a corporation of Ohio
No Drawing. Filed Sept. 27, 1963, Ser. No. 311,962
7 Claims. (Cl. 260—468)

This invention relates to a novel class of compounds comprising esters of cyclododecadiene carboxylic acids. More especially, it relates to aliphatic esters of 4,8-cyclododecadiene-1-carboxylic acids wherein the aliphatic substituent contains from 1 to about 4 carbon atoms, e.g. a radical selected from the group consisting of methyl, ethyl, propyl, isopropyl, n-butyl and t-butyl.

It has been discovered that the cyclododecadiene carboxylic acid esters of this invention possess powerful lasting woody odors reminiscent of vetiver oil. Vetiver oil and its derivatives are well known perfume compositions. It has also been discovered that these novel compounds are non-toxic, are not sensitizers, and, in fact, are quite mild. Accordingly, compounds of this invention can be used to scent soaps, creams, toilet water, alcoholic extracts, and other cosmetic and household detergent products.

The odor properties of large ketone-containing ring compounds such as muscone (15 carbon cyclic group), civetone (16 carbon cyclic group) and exaltone (15 carbon cyclic group) have been known for some time. The smaller 12-membered ring ketones, however, do not possess odors or fragrances of any value. Thus, the potent and persistent woody odor possessed by the novel class of compounds described herein was completely unexpected and drastically different from that of previously reported cyclododecane compounds.

An object of this invention is the preparation of a new class of cyclododecadiene carboxylic acid ester compounds. A further object is the preparation of a new class of lower aliphatic esters of 4,8-cyclododecadiene-1-carboxylic acids having desirable olfactory properties.

The new compounds specifically contemplated by this invention are:

Methyl-4-cis-8-trans-cyclododecadiene-1-carboxylate
Methyl-4-trans-8-cis-cyclododecadiene-1-carboxylate
Methyl-4,8-trans,trans-cyclododecadiene-1-carboxylate
Ethyl-4-cis-8-trans-cyclododecadiene-1-carboxylate
Ethyl-4-trans-8-cis-cyclododecadiene-1-carboxylate
Ethyl-4,8-trans,trans-cyclododecadiene-1-carboxylate
Propyl-4-cis-8-trans-cyclododecadiene-1-carboxylate
Propyl-4-trans-8-cis-cyclododecadiene-1-carboxylate
Propyl-4,8-trans,trans-cyclododecadiene-1-carboxylate
Isopropyl-4-cis-8-trans-cyclododecadiene-1-carboxylate
Isopropyl-4-trans-8-cis-cyclododecadiene-1-carboxylate
Isopropyl-4,8-trans,trans-cyclododecadiene-1-carboxylate
n-Butyl-4-cis-8-trans-cyclododecadiene-1-carboxylate
n-Butyl-4-trans-8-cis-cyclododecadiene-1-carboxylate
n-Butyl-4,8-trans,trans-cyclododecadiene-1-carboxylate
t-Butyl-4-cis-8-trans-cyclododecadiene-1-carboxylate
t-Butyl-4-trans-8-cis-cyclododecadiene-1-carboxylate
t-Butyl-4,8-trans,trans-cyclododecadiene-1-carboxylate The starting material for the preparation of the novel class of compounds is 1,5,9-cyclododecatriene. This compound is known in the prior art, being prepared by the trimerization of butadiene with alkyl metal type catalysts. A suitable method for its preparation is found in Angewante Chemie, vol. 69, No. 11:397 (June 7, 1957). Of the four theoretically possible stereo isomers of 1,5,9-cyclododecatriene, only two have thus far been isolated. These are the cis,trans,trans and the trans,trans,trans isomers, as shown below:

cis,trans,trans
M.P. −18° C.

trans,trans,trans
M.P. −34° C.

Both of these two isomeric forms are suitable starting materials for purposes of this invention.

In general terms, the synthesis route to the ester compounds proceeds as follows. The 1,5,9-cyclododecatriene is reacted with hydrogen bromide, in the presence of a free radical catalyst, producing monobrominated cyclododecadienes. The three possible bromo compounds, i.e., 1-bromo-4-cis-8-trans-cyclododecadiene, 1-bromo-4-trans-8-cis-cyclododecadiene, and 1-bromo-4,8-trans,trans-cyclododecadiene, are then converted to the carboxylic acid esters by processes described more fully hereinafter. The methyl ester derivatives, for instance such as methyl-4-cis-8-trans-cyclododecadiene-1-carboxylate, methyl-4-trans-8-cis-cyclododecadiene-1-carboxylate, and methyl 4,8-trans,trans-cyclododecadiene-1-carboxylate are prepared by treatment of the bromo compounds with magnesium to form a Grignard reagent, subsequent carboxylation with carbon dioxide followed by diazomethane alkylation. The other lower aliphatic esters, i.e., ethyl, propyl, isopropyl, n-butyl and t-butyl, are prepared from the corresponding diene carboxylic acids by treatment of the acid chloride with the appropriate alcohol. These procedures are illustrated in detail in the following examples, wherein all temperatures are in degrees centigrade.

EXAMPLE I

*Preparation of the methyl ester of 4-cis-8-trans-, 4-trans-8-cis-, and 4,8-trans,trans-cyclododecadiene-1-carboxylic acids*

A. *Hydrobromination of 1,5,9-cis,trans,trans-cyclododecatriene.*—Ozone (0.2976 g., 6.2×10⁻³ moles, 1.0 mole percent) was added over a period of 13 minutes, 36 seconds, from a Welsbach Ozonator Model T-23 at a rate of 4.5×10⁻⁴ moles per minute into a solution of 100.0 g. (0.616 mole) of 1,5,9-cis,trans,trans-cyclododecatriene in 100 ml. of anhydrous methylene chloride cooled to −63° C. After removal of residual oxygen by flushing with helium for 10 minutes, dry hydrogen bromide was bubbled into the olefin at a rate of 2.0 cubic feet per hour for a period of 10 minutes. A temperature rise of 38° C. (−63° C. to −25° C.) was noted during this addition.

The bulk of the excess HBr was removed from the system by flushing with helium for 5 minutes, the reaction mixture diluted with 400 ml. of ether, and poured into 200 ml. of cold 5% aqueous sodium bicarbonate. The organic layer was partitioned, washed with cold water, dried over magnesium sulfate and the solvent removed under reduced pressure to afford 134.0 g. of light yellow liquid. A 67 g. portion of this liquid was distilled from an 18 inch spinning band column to afford 62.35 g. (83%) of a monobromocyclododecadiene reaction product, B.P. 111° C./1.2 mm., $n_D^{25}$ 1.5332. Infrared spectrum: 10.2–10.4μ (trans double bond); 14.4μ (cis double bond).

*Anaylsis.*—Calculated for $C_{12}H_{19}Br$: C, 59.3; H, 7.9; Br, 32.9. Found: C, 59.2; H, 7.7; Br, 33.1.

B. *Conversion of the monobromocyclododecadiene reaction product to methyl esters.*—To a mixture of 16.96 g. (0.698 mole) of magnesium and 25 ml. of tetrahydrofuran, freshly distilled over lithium aluminum hydride, was added 20.0 g. of the monobromocyclododecadiene reaction product prepared from 1,5,9-cis,trans,trans-cyclododecatriene according to part A above. After a short induction period the reaction mixture warmed to 60° C. An additional 135.0 g. of monobromo compound (total=155.0 g., 0.638 mole) dissolved in 450 ml. of dry tetrahydrofuran was added dropwise over a 2-hour period as the temperature fluctuated between 30–60° C. After the addition was complete, the reaction mixture was heated at reflux for 30 minutes, then cooled to 0° C. The dropping funnel was replaced with a gas inlet tube that extended below the surface of the reaction mixture and anhydrous carbon dioxide was bubbled in, with vigorous stirring, for 4 hours while the temperature was maintained at 0° C. The product was hydrolyzed by the dropwise addition of 500 ml. of 5% sulfuric acid to the reaction mixture maintained at 0° C. The product was extracted with three 200 ml. portions of ether and the ethereal layer washed well with water. The acidic product was extracted with three 200 ml. portions of 10% sodium hydroxide, the basic extracts washed with ether and acidified with concentrated hydrochloric acid to pH 1. The product was dissolved in ether, the ethereal solution washed with water, dried over magnesium sulfate and the ether removed under reduced pressure to yield 53.0 g. (40%) of the mixture of carboxylic acids. The infrared spectrum showed the presence of a cis double bond at $14.3\mu$ and a trans double bond at $10.25–10.35\mu$. The carboxylic acid mixture was dissolved in 200 ml. of ether and cooled to 0° C. To this mixture was added a solution of 14.0 g. (0.33 mole) of diazomethane in 500 ml. of ether. The mixture was stored 2 hours at 0–5° C., and the excess diazomethane decomposed by thorough washing with 10% hydrochloric acid. The ethereal solution was washed with water, dried over magnesium sulfate and evaporated under reduced pressure to afford 59.0 g. (40%) of the mixture of methyl cyclododecadiene carboxylates. Analysis by gas chromatography through a 10′ by ¼″ stainless steel column packed with 30% succinic acid-triethylene glycol polymer on 60/80 mesh acid washed chromasorb at 197° and helium flow rate of 42 ml./minute indicated the presence of two isomeric methyl 4,8-cis,trans-cyclododecadiene-1-carboxylates and the 4,8-trans,trans-cyclododecadiene-1-carboxylate in the ratio 33.4:41.2:26.4. The mixture of methyl 4,8-cis, trans-cyclododecadiene-1-carboxylates was separated from the trans,trans isomer by fractional distillation, B.P. 131° C./4.2 mm. Infrared spectrum: $5.78\mu$ (ester); $10.25–10.35\mu$ (trans double bond); $14.3\mu$ (cis double bond).

*Analysis.*—Calculated for $C_{14}H_{22}O_2$: C, 75.6; H, 10.0. Found: C, 75.5; H, 10.0.

As confirmation of structure, 1.5 g. (0.0062 mole) of the above methyl cyclododecadiene carboxylate mixture dissolved in 100 ml. of absolute alcohol was hydrogenated in a Parr hydrogenator at 50 p.s.i. initial hydrogen pressure in the presence of 0.500 g. of 10% palladium on charcoal catalyst over a period of 4 hours at 27° C. After filtration of catalyst and removal of solvent, the residual methyl cyclododecane carboxylate was dissolved in 100 ml. of 10% alcoholic potassium hydroxide and stored 16 hours at room temperature. The alcohol was removed under reduced pressure, the water layer acidified and extracted with ether. The ethereal layer was washed with water, dried over magnesium sulfate, solvent removed under reduced pressure, and the residue recrystallized from petroleum ether to afford 1.40 g. (99%) of cyclododecane carboxylic acid, as colorless needles, M.P. 95–97.5° C. The product was recrystallized from petroleum ether for analysis, M.P. 97–99° C. [lit. M.P. 99–99.5° C., M. Genas and T. Rull, Bull. Soc. Chim. France, (10), 1837 (1962)].

*Analysis.*—Calculated for $C_{13}H_{24}O_2$: C, 73.5; H, 11.4. Found: C, 73.2; H, 11.3.

The trans,trans isomer was identified by comparison of the gas chromatographic retention time with that of a sample of the trans,trans isomer prepared from 1,5,9-trans,trans,trans-cyclododecatriene.

EXAMPLE II

*Preparation of the methyl ester of 4,8-trans,trans-cyclododecadiene-1-carboxylic acid*

A. *Hydrobromination of 1,5,9-trans,trans,trans-cyclododecatriene isomer.*—Hydrogen bromide was added over a period of 20 minutes to a solution of 20.0 g. (0.124 mole) of 1,5,9-trans,trans,trans-cyclododecatriene in 50 ml. of methylene chloride to which had been added 0.164 g. ($1.24 \times 10^{-3}$ mole, 1 mole percent) ozone. During hydrogen bromide addition the temperature fluctuated between 0°–22° C. After work-up there was obtained 30.6 g. of light yellow liquid. Distillation from an 18 inch spinning band column afforded 21.72 g. (73%) of 1-bromo-4,8-trans,trans-cyclododecadiene as a colorless liquid, B.P. 108° C./1.8 mm., $n_D^{25}$ 1.5322. Infrared spectrum: $14.4\mu$ (cis double bond).

*Analysis.*—Calculated for $C_{12}H_{19}Br$: C, 59.3; H, 7.9; Br, 32.9. Found: C, 59.3; H, 8.0; Br, 32.7.

B. *Conversion to the Methyl Ester.*—From 24.3 g. (0.10 mole) of the 1-bromo-4,8-trans,trans-cyclododecadiene prepared according to the process just described above, there was obtained 6.2 g. (30%) of 4,8-trans,trans-cyclododecadiene-1-carboxylic acid as colorless needles, M.P. 85–87.5° C. The material was recrystallized from petroleum ether (B.P. 30–60° C.) and dried for analysis, M.P. 88–90° C.

*Analysis.*—Calculated for $C_{13}H_{20}O_2$: C, 75.0; H, 9.7; NE, 208. Found: C, 74.9; H, 9.5; NE, 208.

As confirmation of structure, 0.500 g. (0.0024 mole) of the above acid dissolved in 75 ml. of absolute alcohol was hydrogenated in a Parr hydrogenator at 50 p.s.i. initial hydrogen pressure in the presence of 0.500 g. of 10% palladium on charcoal over a period of 4 hours at 27° C. After filtration of catalyst and removal of solvent under reduced pressure, the residue was crystallized from petroleum ether to afford 0.350 g. (85%) of cyclododecane carboxylic acid as colorless needles, M.P. 98.6–99.8° C. (lit. M.P. 99–99.5° C.).

*Analysis.*—Calculated for $C_{13}H_{24}O_2$: C, 73.5; H, 11.4. Found: C, 73.6; H, 11.3.

The methyl ester was formed by treatment of a solution of 0.50 g. of the 4,8-trans,trans-cyclododecadiene-1-carboxylic acid in 100 ml. of anhydrous ether with ethereal diazomethane prepared from 5.0 g. of nitrosomethyl urea. The ester was isolated by distillation from a modified Hickman still, B.P. 90° C./0.52 mm., $n_D^{25}$ 1.4912 (0.90 g., 85%). Infrared spectrum: $5.78\mu$ (ester); $10.25–10.35\mu$ (trans olefin); no absorption at $14.3\mu$ (cis-olefin). The liquid gave out one peak when analyzed by gas chromatography on a 10′ by ¼″ stainless steel column packed with 30% succinic acid-triethylene glycol polymer on 60/80 mesh acid washed chromasorb at 197° C. and helium flow rate of 42 ml./minute.

*Analysis.*—Calculated for $C_{14}H_{22}O$: C, 75.6; H, 10.0. Found: C, 75.4; H, 10.0.

As mentioned previously the ethyl, propyl, isopropyl, n-butyl, and t-butyl ester compounds can be prepared by first forming the cyclododecadiene carboxylic acids as in Example I above, converting to the acid chloride, and then reacting this acid chloride with an appropriate lower alcohol. Examples III, IV and V illustrate this aspect of the invention.

EXAMPLE III

*Preparation of the ethyl esters of 4-cis-8-trans-, 4-trans-8-cis-, and 4,8-trans,trans-cyclododecadiene-1-carboxylic acids from 1,5,9-cis,trans,trans-cyclododecatriene*

A. *Formation of 4-cis-8-trans-cyclododecadiene-1-carboxylic acid chloride, 4-trans-8-cis-cyclododecadiene-1-carboxylic acid chloride and 4,8-trans,trans-cyclododecadiene-1-carboxylic acid chloride.*—To 82.0 g. (0.393 mole) of the cyclododecadiene carboxylic acids prepared according to the method described in Example I was added 100.0 g., 0.79 mole, of oxalyl chloride in a 1 liter, 3-necked round bottom flask equipped with a reflux condenser and nitrogen system and this mixture allowed to stand at room temperature for 16 hours. A vigorous reaction took place immediately, but cooling was not necessary. After the excess oxalyl chloride was removed under reduced pressure the reaction mixture was diluted with 300 ml. of petroleum ether, B.P. 41–45° C., and washed well with ice water. After drying over magnesium sulfate the petroleum ether was removed under reduced pressure to yield 80.0 g. of a light yellow liquid composed of a mixture of 4-cis-8-trans-cyclododecadiene-1-carboxylic acid chloride, 4-trans-8-cis-cyclododecadiene-1-carboxylic acid chloride and 4,8-trans,trans-cyclododecadiene-1-carboxylic acid chloride. This liquid was distilled through an Ace glass microstill and the fractions B.P. 106° C./0.25 mm. were collected: 76.5 g. (85%) $n_D^{25}$ 1.5092. Infrared spectrum: $5.59\mu$ (carbonyl), $10.3\mu$ (trans double bond) and $14.2\mu$ (cis double bond).

*Analysis.*—Calculated for $C_{13}H_{19}OCl$: C, 68.9; H, 8.5. Found: C, 68.7; H, 8.3.

B. *Conversion of the acid chlorides to the ethyl esters.*—Three g., 0.013 mole, of the acid chlorides were added to ethyl alcohol (1.43 g., 0.013 mole) dissolved in 10 ml. of dry pyridine. Reaction took place immediately and the solution warmed slightly. This mixture was allowed to stand at room temperature for 16 hours. The reaction mixture was then poured into 100 ml. of ice water and washed into a separatory funnel with 200 ml. of ether. The ethereal layer was washed in turn with ice water, 5% hydrochloric acid, ice water, 5% sodium bicarbonate solution and ice water. After drying over magnesium sulfate the ether was removed under reduced pressure to yield 2.7 g. of colorless liquid composed of ethyl 4-cis-8-trans-cyclododecadiene-1-carboxylate, ethyl 4-trans-8-cis-cyclododecadiene-1-carboxylate and ethyl 4,8-trans,trans-cyclododecadiene-1-carboxylate. This liquid was fractionally distilled through an 18 inch spinning band column. The fractions B.P. 75–77° C./0.15 mm. were collected, 1.80 g. (58%) $n_D^{25}$ 1.4872. Infrared spectrum: $5.8\mu$ (carbonyl), $8.75\mu$ (ester linkage), $10.3\mu$ (trans double bond) and $14.2\mu$ (cis double bond).

*Analysis.*—Calculated for $C_{17}H_{28}O_2$: C, 77.2; H, 10.7. Found: C, 76.9; H, 10.3.

EXAMPLE IV

*Preparation of isopropyl esters of 4-cis-8-trans-, 4-trans-8-cis-, and 4,8-trans,trans-cyclododecadiene-1-carboxylic acids from 1,5,9-cis,trans,trans-cyclododecatriene*

A. *Acid chloride preparation.*—The procedure outlined in Example III, part A, was repeated in exactly the same manner to form the acid chloride reaction products.

B. *Conversion of the acid chlorides to isopropyl esters.*—Seven g. (0.031 mole) of the acid chloride reaction product prepared according to part A above were added to 1.86 g. (0.031 mole) of isopropanol dissolved in 10 ml. of dry pyridine. Reaction took place immediately and the solution warmed slightly. This mixture was allowed to stand at room temperature for 16 hours. The reaction mixture was poured into 100 ml. of ice water and washed into a separatory funnel with 200 ml. of ether. The ethereal layer was washed in turn with ice water, 5% hydrochloric acid, ice water, 5% sodium bicarbonate solution, and ice water. After drying over magnesium sulfate the ether was removed under reduced pressure to yield 6.1 g. of colorless liquid. This liquid was fractionally distilled through an 18 inch spinning band column. The combined fractions comprised of a mixture of isopropyl 4-cis-8-trans-cyclododecadiene-1-carboxylate, isopropyl 4-trans-8-cis-cyclododecadiene-1-carboxylate, and isopropyl 4,8-trans,trans-cyclododecadiene-1-carboxylate in the ratio 42:35:24, B.P. 84° C./1.6 mm., were collected, 4.70 g. (60%), $n_D^{25}$ 1.4810. Infrared spectrum: $5.8\mu$ (carbonyl), $8.75\mu$ (ester linkage), $10.3\mu$ (trans double bond) and $14.2\mu$ (cis double bond).

*Analysis.*—Calculated for $C_{18}H_{30}O_2$: C, 76.8; H, 10.5. Found: C, 76.4; H, 10.4.

EXAMPLE V

*Preparation of t-butyl esters of 4-cis-8-trans-, 4-trans-8-cis-, and 4,8-trans,trans-cyclododecadiene-1-carboxylic acids*

A. *Acid chloride preparation.*—The procedure outlined in Example III, part A, was repeated in exactly the same manner to form the acid chloride reaction mixture.

B. *Conversion of the acid chlorides to t-butyl esters.*—Seven g. (0.031 mole) of the acid chloride reaction product prepared according to part A above were added to 2.30 g. (0.031 mole) of t-butyl alcohol dissolved in 10 ml. of dry pyridine. The reaction took place immediately and the solution warmed slightly. This mixture was allowed to stand at room temperature for 16 hours. The reaction mixture was poured into 100 ml. of ice water and washed into a separatory funnel with 200 ml. of ether. The ethereal layer was washed in turn with ice water, 5% hydrochloric acid, ice water, 5% sodium bicarbonate solution, and ice water. After drying over magnesium sulfate, the ether was removed under reduced pressure to yield 6.2 g. of colorless liquid. The combined fractions consisting of a mixture of t-butyl 4-cis-8-trans-cyclododecadiene-1-carboxylate, t-butyl 4-trans-8-cis-cyclododecadiene-1-carboxylate, and t-butyl 4,8-trans,trans-cyclododecadiene-1-carboxylate, in the ratio 42:35:24 B.P. 85° C./0.2 mm. were collected, 3.05 g. (34%), $n_D^{25}$ 1.4790. Infrared spectrum: $5.8\mu$ (carbonyl), $8.75\mu$ (ester linkage), $10.3\mu$ (trans double bond) and $14.2\mu$ (cis double bond).

*Analysis.*—Calculated for $C_{19}H_{32}O_2$: C, 77.2; H, 10.7. Found: C, 76.9; H, 10.3.

REACTION STAGES

Hydrobromination of cyclododecatriene

The course of the hydrobromination reaction with either of the isomeric cyclododecatrienes, e.g., 1,5,9-cis,-trans,trans- or 1,5,9-trans,trans,trans-cyclododecatriene is quite sensitive to the particular isomer being used, the reaction conditions (especially temperature), the catalyst used and the concentration thereof.

Monobromination occurs to 1,5,9-cis,trans,trans-cyclododecadiene with formation of a mixture of three possible monobromo products:

1-bromo-4-trans-8-trans-cyclododecadiene (I), 1-bromo-4-trans-8-cis-cyclododecadiene (II), and 1-bromo-4-cis-8-trans-cyclododecadiene (III).

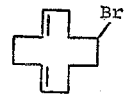

1-bromo-4-trans-8-trans-cyclododecadiene

I

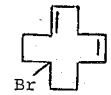

1-bromo-4-trans-8-cis-cyclododecadiene

II

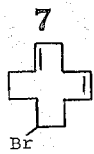

1-bromo-4-cis-8-trans-cyclododecadiene

III

Example I, above, is an illustration of such a process.

A modified process is also provided by which monoaddition of hydrogen bromide to 1,5,9-cis,trans,trans-cyclododecatriene can predominate at the trans double bonds with formation of the two monobromides, 1-bromo-4-cis-8-trans-cyclododecadiene and 1-bromo-4-trans-8-cis-cyclododecadiene. In order to obtain predominate addition of hydrogen bromide at the trans double bonds of the cyclododecatriene, lower catalyst concentrations (e.g. 0.3 mole percent or less) need to be employed, and the reaction stopped at about 25% completion. Using this technique the ratio of addition at the trans double bond to addition at the cis double bond was 96:4.

The following example illustrates this technique of predominate addition to the trans double bonds.

Hydrogen bromide was added over a period of 10 minutes to 25 g. (0.154 mole) of 1,5,9-cis,trans,trans-cyclododecatriene which had been treated with 0.0222 g. ($4.6 \times 10^{-4}$ mole; 0.3 mole percent) ozone. During hydrogen bromide addition the temperature fluctuated between 0–15° C. The mixture was immediately diluted with 200 ml. of ether, washed with cold water and dried over magnesium sulfate. The solvent was removed under reduced pressure and the residual liquid distilled from an 18 inch spinning band column to afford 8.33 g. of recovered triene, B.P. 37° C./0.2 mm. and 9.98 g. (25%) of monobromocyclododecadiene, B.P. 78–79° C./0.15 mm. Infrared spectrum: 10.2–10.4μ (trans double bond); 14.4μ (cis double bond).

Analysis.—Calculated for $C_{12}H_{19}Br$: C, 59.30; H, 7.89; Br, 32.81. Found: C, 59.37; H, 7.72; Br, 32.08.

Monobromination of 1,5,9-trans,trans,trans-cyclododecatriene is effected with formation of 1-bromo-4,8-trans,trans-cyclododecadiene (Formula I above). A specific example of such a process is presented below. In this example, the conditions for HBr addition to the trans,trans,trans isomer were essentially the same as for addition to the cis,trans,trans isomer described in Example I above.

Hydrogen bromide was added over a period of 20 minutes to a solution of 20.0 g. (0.124 mole) of 1,5,9-trans,trans,trans-cyclododecatriene in 50 ml. of methylene chloride to which had been added 0.164 g. ($1.24 \times 10^{-3}$ mole, 1 mole percent) ozone. During hydrogen bromide addition the temperature fluctuated between 0–22° C. After work-up there was obtained 30.6 g. of light yellow liquid. Distillation from an 18 inch spinning band column afforded 21.72 g. (73%) of 1-bromo-4,8-trans,trans-cyclododecadiene as a colorless liquid, B.P. 108° C./1.8 mm., $n_D^{25}$ 1.5322. Infrared spectrum: 14.4μ (cis double bond).

Analysis.—Calculated for $C_{12}H_{19}Br$: C, 59.3; H, 7.9; Br, 32.9. Found: C, 59.3; H, 8.0; Br, 32.7.

Each of the bromo compounds prepared by any of the foregoing processes can subsequently be converted to the novel esters of the present invention.

In each of the hydrobromination processes described above, the unique feature is the use of an ozonide catalyst as a free radical initiator. Of the catalysts tested benzoyl peroxide and the ozonide were the most effective initiators for the hydrobromination reaction. Of these two, the ozonide was significantly better, especially at low temperatures and short HBr contact times. At higher temperatures and longer HBr contact times with cyclododecatriene, little difference in effectiveness was noticed between the ozonide and benzoyl peroxide. Tertiary-butyl hydroperoxide and di-tertiary-butyl peroxide, both of which were commonly used initiators of free radical processes, were much poorer catalysts for the addition of HBr to cyclododecatriene. No HBr addition occurs in the absence of a free radical initiator. This indicates fairly conclusively that no ionic reaction occurs at the temperatures used.

The preferred ozonide catalyst can be formed in situ by passing a desired concentration of ozone into the cyclododecatriene or a solution of the triene in a suitable solvent, e.g. any aprotic solvent such as methylene chloride, pentane, benzene, etc. The ozone reacts with the cyclododecatriene isomers to form a corresponding ozonide, it is believed, having the structures below.

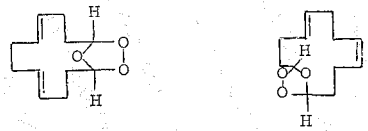

The ozonide then reacts with hydrogen bromide to initiate the chain process in the following general manner.

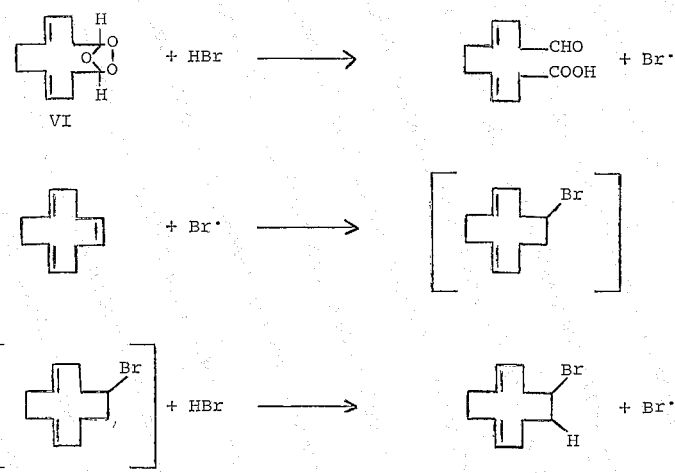

There are two primary advantages for using an ozonide catalyst for preparing the bromo-precursors of the novel esters of the present invention: (1) It is more convenient to generate the ozonide catalyst in situ by ozone addition than to store the normal, usual free radical initiators. (2) Due to the greater solubility of the ozonides in solvents at the low temperatures (−63° to 0° C.) required for maximum yields of monobromination this catalyst is preferred over the typical free radical initiators, such as benzoyl peroxide, which tend to crystallize or separate from the reaction mixture. Consequently, the yields of monobromocyclododecadiene product are better and the rate of addition is faster when an ozonide catalyst is employed than when other typical initiators are used.

The mono bromine addition products of 1,5,9-trans,-trans,trans-cyclododecatriene are considerably less complex than the 1,5,9-cis,trans,trans-isomer since only one monobromo product is possible. However, the addition to the all trans isomer proceeds with somewhat greater difficulty than addition to the cis,trans,trans-isomer. The ozonide catalyst proved to be a markedly better catalyst than benzoyl peroxide in reactions involving the all trans isomer.

*Analysis and structure determination of monobrominated products*

The monobromo compounds cannot be separated by fractional distillation and are too labile to be analyzed by gas chromatography. However, the bromides can be readily converted by sodium in liquid ammonia reduction to the corresponding cyclododecadienes which can be easily separated by gas chromatography. Thus, reduction of 1-bromo-4,8-trans,trans-cyclododecadiene with sodium in liquid ammonia affords 1,5-trans,trans-cyclododecadiene while sodium reduction of 1-bromo-4-cis-8-trans-cyclododecadiene and 1-bromo-4-trans-8-cis-cyclododecadiene yields 1-cis-5-trans-cyclododecadiene. Structurally, these reduction reactions can be represented in the following general equations. Specific examples are also presented below.

cyclododecadienes is a manifestly efficient process by which the isomers can be isolated in high purity.

This aspect of the present invention is illustrated by the following discussion.

*Sodium reduction of the 1-bromo-4-cis-8-trans-cyclododecadiene*

*Preparation of 1-cis-5-trans-cyclododecadiene.*—To a well stirred solution of 2.09 g. (0.087 mole) of sodium dissolved in 200 ml. liquid ammonia, placed in a 500 ml. flask fitted with Dry Ice condenser, dropping funnel and nitrogen system, was added dropwise, over a period of 15 minutes, 10.0 g. (0.041 mole) of the monobromocyclododecadiene reaction product prepared according to part A of Example I, above, dissolved in 60 ml. of anhydrous ether. The mixture was stirred an additional 30 minutes, the excess sodium destroyed by dropwise addition of 80 ml. of methanol, and the ammonia evaporated. The residue was diluted with 200 ml. of ether, the ethereal solution washed with 10% hydrochloric acid and water, and dried over magnesium sulfate. Evaporation of solvent afforded 6.05 g. (91%) of a colorless liquid, $n_D^{25}$ 1.4959. Analysis by gas chromatography indicated the presence of 5 compounds: cyclododecane (1%), identified by comparison with an authentic sample of cyclododecane, M.P. 59°–60° C., prepared by catalytic hydrogenation of 1,5,9-cis,trans,trans-cyclododecatriene (lit. M.P. 60°–61° C.); 1,5-trans,trans-cyclododecadiene (13.8%), identified by comparison with an authentic sample of 1,5-trans,trans-cyclododecadiene, prepared by sodium in liquid ammonia reduction of 1-bromo-4,8-

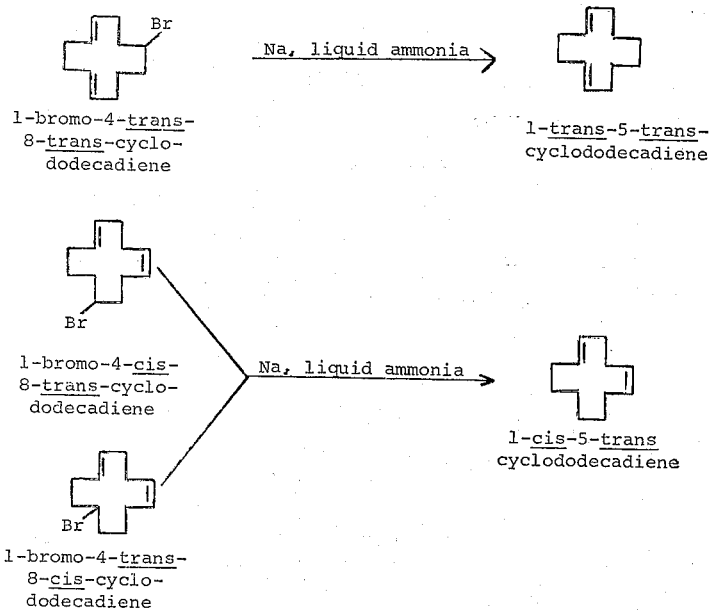

1-bromo-4-<u>trans</u>-8-<u>trans</u>-cyclododecadiene

1-<u>trans</u>-5-<u>trans</u>-cyclododecadiene 1-bromo-4-<u>cis</u>-8-<u>trans</u>-cyclododecadiene 1-<u>cis</u>-5-<u>trans</u> cyclododecadiene 1-bromo-4-<u>trans</u>-8-<u>cis</u>-cyclododecadiene The relative amounts of 1,5-cis,trans-diene and 1,5-trans,trans-diene recovered by the sodium reduction step represent the addition of HBr to trans and cis double bonds, respectively, i.e., the ratio of 1-bromo-4-trans-8-cis-cyclododecadiene plus 1-bromo-4-cis-8-trans-cyclododecadiene to 1-bromo-4-trans-8-trans-cyclododecadiene.

The structures of the cyclododecadienes were confirmed by elemental analysis, iodine value, infrared spectroscopy, and reduction to the known cyclododecane. Thus, the infrared spectrum of the cis-trans-diene showed absorption at 14.2–14.3μ (cis olefin) and at 10.3μ (trans olefin) while the trans,trans-diene showed absorption only at 10.3μ. Conversion of the dienes to cyclododecane showed conclusively that a transannular ring contraction did not occur during hydrobromination.

It is noteworthy that the synthesis of the cyclododecadienes by reduction of the corresponding 1-bromo-4,8- trans,trans-cyclododecadiene; 1,5-cis,trans-cyclododecadiene (76.8%), isolated by fractional distillation through an 18 inch spinning band column, B.P. 73° C./1.75 mm., $n_D^{25}$ 1.4979. The infrared spectrum showed the presence of both cis (14.3μ) and trans (10.3μ) olefin.

*Analysis.*—Calculated for $C_{12}H_{20}$: C, 87.8; H, 12.2; iodine value, 309.5. Found: C, 87.6; H, 12.3; iodine value, 304.5; and a mixture of cyclododecatrienes (9.4%), identified by comparison with authentic samples of 1,5,9-cis,trans,trans-cyclododecatriene obtained from Enjay Corporation, and 1,5,9-trans,trans,trans-cyclododecatriene obtained from Cities Service, Inc.

*Sodium reduction of 1-bromo-4,8-trans,trans-cyclododecadiene*

*Preparation of 1,5-trans,trans-cyclododecadiene.*—The free radical hydrobromination product of 1,5,9-trans, trans,trans-cyclododecatriene was reduced in the same manner described for the 1-bromo-4,8-cis,trans-cyclododecadiene immediately above. From 15.0 g. (0.062 mole) of 1-bromo-4,8-trans,trans-cyclododecadiene there was obtained 8.79 g. (88%) of a liquid, $n_D^{25}$ 1.4959. Analysis by gas chromatography indicated the presence of two compounds: 1,5-trans,trans-cyclododecadiene (80%), and trans-cyclododecene (20%), identified by comparison with an authentic sample isolated by preparative gas chromatography from a 40:60 mixture of cis- and trans-cyclododecene prepared by dehydration of cyclododecanol with boron trifluoride etherate. The 1,5-trans,trans-cyclododecadiene was isolated by fractional distillation through an 18 inch spinning band column, B.P. 83° C./3.8 mm., $n_D^{25}$ 1.4940. IR: 10.3μ (trans double bond).

*Analysis.*—Calculated for $C_{12}H_{20}$: C, 87.8; H, 12.2; I.V., 309.5. Found: C, 87.6; H, 12.5; I.V., 311.5.

*Conversion of the bromo compounds to the novel alkyl esters of cyclododecadiene carboxylic acid*

This aspect of the present invention has been described previously and has been illustrated by Examples I–V.

The reaction equations for conversion to the methyl ester compounds as specifically exemplified by Examples I and II above can be generally thought of as follows, starting with the monobrominated cyclododecadiene compounds.

While the acid chloride-alcohol route has been discussed above in terms of forming the ethyl and higher alkyl esters, it should be understood that the methyl ester also can be prepared by this route. In place of ethyl alcohol, isopropyl alcohol, etc., methyl alcohol can be used. The esters can also be prepared from the carboxylic acids by variations in the commonly accepted methods of esterification (e.g. (1) Fisher esterification, (2) treatment of the pyridinium salt of the acid with the appropriate alkyl halide, (3) etc.).

The Grignard reaction (Step 1 above) will proceed in typical ether solvents, such as ethyl ether, but tetrahydrofuran is by far the preferred solvent. The temperature of the reaction is not critical as indicated by the fluctuation in temperature (30–60° C.) during addition. For optimum yields of carboxylic acid, the temperature of the reaction mixture during carbon dioxide addition should be maintained in tht region of 0° C., but, again, this temperature is not critical. Any inorganic acid, e.g. hydrochloric, sulfuric, etc., may be used for the hydrolysis of the Grignard.

The principal side products in the Grignard reaction (Step 1 above) are the corresponding dimers, formed by Wurtz coupling, and the dienes, 1-cis-5-trans-cyclododecadienes and 1,5-trans trans-cyclododecadienes, formed by hydrolysis of unreacted Grignard.

As mentioned previously, the woody odor of the new ester compounds prepared according to this invention is similar to that of vetiver oil and its derivatives and can

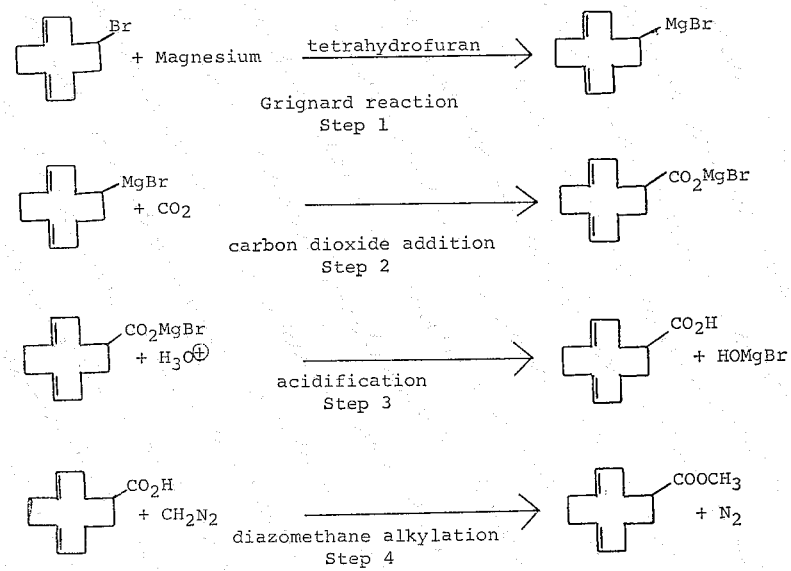

The procedure for obtaining the ethyl, propyl, isopropyl, n-butyl and t-butyl as seen from Examples III to V is exactly the same as outlined above for the methyl ester up through the formation of the diene carboxylic acid, Step 3. Instead of using a diazomethane alkylation step, however, the present technique involves formation of a corresponding acid chloride followed by treatment with the appropriate lower aliphatic alcohol. The general equation is as follows.

be used to replace such compounds in perfume compositions. While vetiver oils and compounds derived from vetiver oils have been used in formulating perfume compositions, they are not readily available and, moreover, are highly expensive. Furthermore, when used to scent such articles as bars of soap, they frequently cause discoloration of the soap products.

The ester compounds of this invention, on the other hand, can be readily prepared at an expense considerably

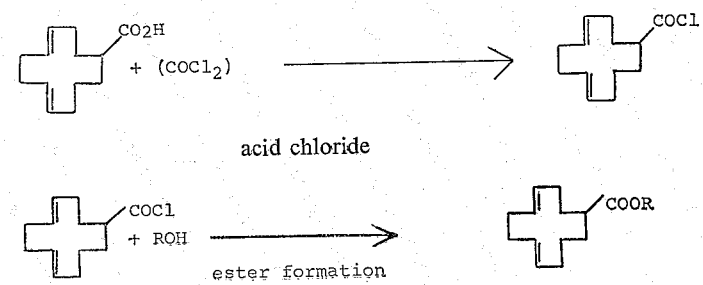

less than the vetiver derivatives. It also has been discovered, quite surprisingly, that when the ester compounds of this invention are used as replacements for vetiver derivatives in soap bar compositions, the problem of bar discloration is solved. The utility of the ester compounds described herein including the non-discoloration discovery is illustrated by the following examples, wherein the methyl ester was selected as being typical in its behavior of all of the novel compounds described herein.

The examples are not to be considered as limiting in any way since obvious modifications may be made without departing from the scope of the invention.

EXAMPLE VI 160.8 grams of a classic soap perfume were weighed up as follows:

| Material: | Grams |
|---|---|
| Jasmin substitute | 31.36 |
| Tuberose substitute | 3.14 |
| Bergamot substitute | 12.54 |
| Gamma methyl ionone | 14.10 |
| Vanillin | .32 |
| Musk ambrette | 2.36 |
| Musk ketone | 9.40 |
| Courmarin | 9.40 |
| Indol | .62 |
| Citronellyl oxyacetaldehyde | .16 |
| Undecalactone | .32 |
| Sage sclaree | .78 |
| Methyl heptine carbonate 10% | .78 |
| Phenyl ethyl alcohol | 4.70 |
| Amyl cinnamic aldehyde | 1.56 |
| Iso eugenol | 2.36 |
| Benzyl acetate | 4.70 |
| Labdanum resin absolute | 1.56 |
| Para cresol | .04 |
| Sandalwood | 11.60 |
| Hydroxycitronellal | 16.62 |
| Undecylenic aldehyde | .32 |
| Lauric aldehyde | .24 |
| Tonquin musk tr | .78 |
| Ambergris tr | .48 |
| Civet tr | 3.14 |
| Ethylene brassylate | .78 |
| Rhodinol extra | 9.40 |
| Ylang extra | 1.56 |
| Wardia [1] | 15.68 |
| | 160.80 |

[1] Registered—Firmenich & Cie.

After thorough mixing, the perfume oil was divided into two equal portions. To one half was added 19.6 grams vetiver acetate; to the other half, 19.6 grams methyl-4-cis-8-trans-cyclododecadiene-1-carboxylate, prepared in accordance with Example I in the specification. Each of these perfumes was thoroughly blended and then incorporated separately into soap base using 1% of the finished perfume. The soap base used was a milled sodium soap made from 80% tallow and 20% coconut oil. It corresponds closely to the "Camay" toilet soap bar manufactured and sold by The Procter & Gamble Company. The soap bases with the added perfumes were each thoroughly mixed and plodded and then pressed into bar form. The odor of the two bars was compared after standing twenty-four hours, one week, one month, and six months in normal room storage conditions. The result was that the two perfumes provided the same general fragrance under each condition of comparison.

Similar substitutions of the methyl ester for vetiver type materials in other perfume formulae revealed the same odor similarities. From this, it is apparent that the novel ester compounds of this invention can be used to replace the more expensive vetiver and its derivatives in all their normal soap perfume usages.

EXAMPLE VII

Evaluations of odor and discoloration properties were performed by comparisons made between a soap base (identical to Example VI) containing 1% vetiver acetate with a soap base containing 1% methyl-4-cis-8-trans-cyclododecadiene-1-carboxylate. Samples were made by weighing one gram of each of the perfume materials into separate 99 gram portions of soap. The soap containing the perfume compounds was mixed and plodded thoroughly and then stamped into bar form. The bars were then stored at room temperature and examined after periods of twenty-four hours, one week, one month, and six months. At each stage of the experiment the soap bars containing the novel methyl ester compound of this invention had the same general fragrance as the bar with the vetiver acetate compound. The bars were comparable in strength or door as well as the woody fragrance thereof. Also at each stage of the experiment the bars were examined for color changes. The bars containing the vetiver acetate were brownish yellow in color while the soap bars containing the methyl 4-cis-8-trans-cyclododecadiene-1-carboxylate retained the original white color throughout the experiment covering a six-month period.

What is claimed is:

1. Lower alkyl esters of 4,8-cyclododecadiene-1-carboxylic acid wherein the lower alkyl substituent contains from 1 to 4 carbon atoms.
2. Methyl 4,8-cyclododecadiene-1-carboxylate.
3. Ethyl 4,8-cyclododecadiene-1-carboxylate.
4. Propyl 4,8-cyclododecadiene-1-carboxylate.
5. Isopropyl 4,8-cyclododecadecadiene-1-carboxylate.
6. N-butyl 4,8-cyclododecadiene-1-carboxylate.
7. T-butyl 4,8-cyclododecadiene-1-carboxylate.

References Cited by the Examiner

UNITED STATES PATENTS

| | | | |
|---|---|---|---|
| 3,085,109 | 4/1963 | Lafont et al. | 260—468 XR |
| 3,128,304 | 4/1964 | Lafont | 260—468 XR |
| 3,227,742 | 1/1966 | Lafont et al. | 260—468 |

LORRAINE A. WEINBERGER, *Primary Examiner.*

RICHARD K. JACKSON, *Examiner.*